INVENTOR.
DONALD R. ZAREMSKI
BY Vincent G. Gioia
ATTORNEY

United States Patent Office 3,556,745
Patented Jan. 19, 1971

3,556,745
STAINLESS STEEL TRIM MEMBER ASSEMBLY
Donald R. Zaremski, Cheswick, Pa., assignor to Allegheny Ludlum Steel Corporation, Brackenridge, Pa., a corporation of Pennsylvania
Original application Apr. 28, 1965, Ser. No. 451,429, now Patent No. 3,484,350, dated Dec. 16, 1969. Divided and this application Apr. 9, 1969, Ser. No. 814,762
Int. Cl. B60r *13/04;* B32b *15/18*
U.S. Cl. 29—183.5      5 Claims

ABSTRACT OF THE DISCLOSURE

The application describes an assembly comprising a stainless steel trim member and a first metal which is less noble in the electromotive series than stainless steel. The trim member has an exposed surface and a contact surface abutting the first metal. The contact surface has a coating of second metal which is less noble in the electromotive series than the first metal whereas the exposed surface is devoid of the second metal.

---

Figure 1A:
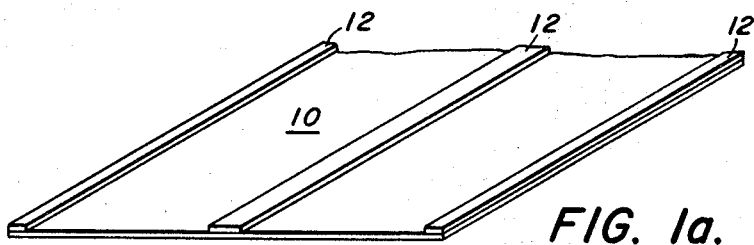

This application is a division of copending application Ser. No. 451,429, filed Apr. 28, 1965, now Pat. No. 3,484,350, issued Dec. 16, 1969.

This invention relates to stainless steel trim members for automoibles, and more particularly to a method of producing stainless steel trim members for automobiles wherein the contact surfaces of the stainless steel, i.e., those surfaces which contact the atuomobile body are coated with a sacrificial metal, and the exposure face of the trim is free of such metal.

Stainless steels are excellent materials for trim and decorative molding members for automobiles because they have outstanding resistance to corrosive elements encountered in road service; further, stainless steel has a bright, lustrous and attractive surface, and no other metal used for automotive trim provides such lasting and attractive beauty and corrosion resistance as stainless steel.

However, stainless steel has one limitation which detracts from its desirability as automotive trim material in that it promotes contact corrosion of the steel body of the automobile in an area around that which is contacted by the stainless steel trim member. While this contact corrosion does not detract from the appearance of the stainless steel, it does detract from the automobile appearance in that red spots and streaks appear on the automotive body in the areas around the automotive trim. Although the mechanism of such contact corrosion is not completely understood, it is believed that the contact of the stainless steel which carbon steel tends to accelerate corrosion of the carbon steel because of glavanic potential differences between stainless steel and the carbon steel. The stainless steel in its normal corrosion resistant condition is more noble in the electromotive series than the carbon steel, the difference in potential being as high as approximately one-half volt. When the stainless steel is held in contact with the carbon steel (and in this context it should be noted that contact with the painted surface of carbon steel is included) an electrolytic cell will be set up between the stainless steel and the carbon steel in the presence of an electrolyte which will accelerate the corrosion attack of the carbon steel. Water, normally encountered in driving, will serve as such an electrolyte.

It has recently been discovered that the contact surfaces of stainless steel trim members may be given a thin coating of a sacrifical metal, such as zinc or aluminum or other metal less noble than carbon steel, and when the trim members are assembled on the carbon steel body, this thin coating of metal will corrode sacrificially with respect to the mild steel of the automobile panel; hence, contact corrosion of the panel will be retarded and, in fact, eliminated, as long as there is sacrifical metal available which will be attacked preferentially to the carbon steel.

There have been several prior proposals for applying such thin layers of metal, but these have proved costly and impractical from a production point of view.

It is therefore a principal object of this invention to provide an improved method of providing a layer of sacrificial metal on the contact surfaces of stainless steel trim members.

Another object of this invention is the provision of an improved method of applying sacrifical metal to the contact surfaces of stainless steel automoive trim members wherein the metal is applied in strips prior to a strip being slit into multiples from which the trim members are formed.

Figure 1:
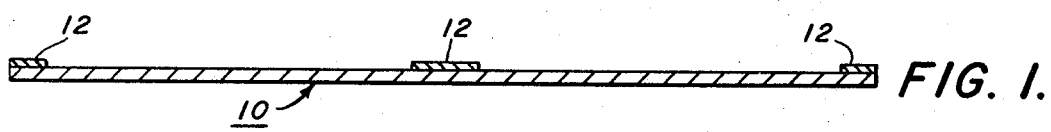
Figure 2A:
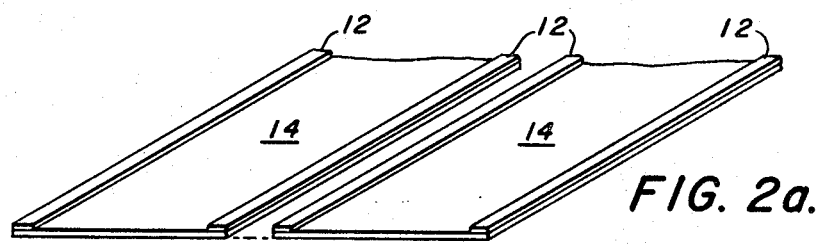
Figure 2:
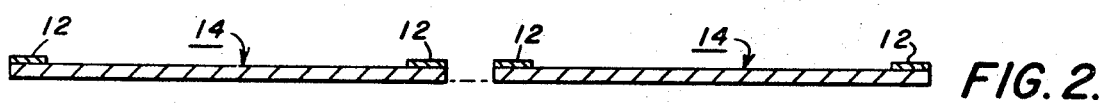
Figure 3:
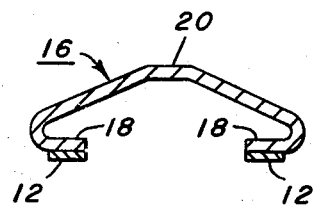
Figure 3A:
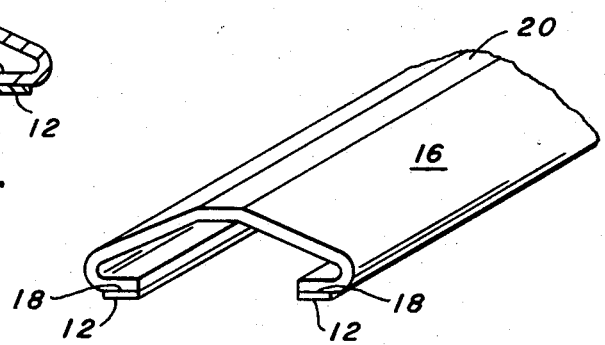

These and other objects, together with a fuller understanding of the invention, will become apparent from the following description when taken in conjunction with the accompanying drawings in which:

FIGS. 1 and 1a are respectively a sectional view and a perspective view of a strip of stainless steel to which bands of sacrifical metal coating have been applied according to this invention;

FIGS. 2 and 2a are respectively a sectional view and a perspective view of two multiples slit from the strip of FIGS. 1 and 1a, and from which automotive trim members are formed; and FIGS. 3 and 3a are respectively a sectional and a perspective view of roll formed automotive trim members formed from one of the multiples of FIGS. 2 and 2a.

Referring now to the drawings, and particularly to FIGS. 1 and 1a, a portion of a strip of stainless steel is shown and designated by the reference character 10. The stainless steel strip 10 has parallel bands of sacrificial metal 12, such as aluminium or zinc, on one surface thereof. These bands of sacrifical metal 12 are located at each edge thereof and at regular intervals thereacross, the center of each band 12 coinciding with the location of the strip at which the strip will be slit to form multiples 14 such as are shown in FIGS. 2 and 2a. From each of the multiples 14, trim members 16, such as are shown in FIGS. 3 and 3a, are roll formed. Each of the trim members 16 has a contact or attachment face 18 which will be in contact with the body of an automobile when it is assembled thereon, and an exposure face which will be exposed to view when the trim members are assembled on an automotive body. As can be seen in FIGS. 3 and 3a, when the trim member has been formed, a band of sacrifical metal 12 will be disposed on the contact face 18 of the trim member and the exposed face 20 will be free of the sacrifical metal and will exhibit a bright, lustrous, stainless steel surface.

Referring again to FIGS. 1 and 2, it will be readily apparent that the width of the bands of sacrifical metal 12 should be equal to approximately twice the width of each of the contact faces 18 of the trim members 16. Thus, when the strip 10 is slit through the center of each of the bands 12, the resulting band at the edge of each multiple will be wide enough to cover the contact face of each trim member.

Although any metal that is less noble than carbon steel can be used as the sacrifical metal, either aluminum or zinc is preferred because of the relative availability commercially, and the relative ease with which aluminum or zinc can be applied.

With respect to the application of the sacrificial metal bands, any method which will produce such bands on the strip is satisfactory. Both aluminum and zinc can be placed on the strip by vacuum vapor deposition, and the zinc can also be applied in the form of zinc-rich paints or by electroplating. In addition to vacuum vapor deposition, aluminum bands can be applied to the strip by bonding strips of aluminum foil to the surface of the stainless steel. This bonding can be accomplished either with physical bonds, such as adhesive, or metallurgical bonds, such as are produced by rolling. These preferred methods of applying either zinc or aluminum are presented by way of illustration only, and are not intended to limit the invention in that any method which will provide strips of sacrificial metal is satisfactory to the practice of this invention.

The exact thickness of the applied strips 12 of sacrificial metal is not particularly critical other than that the strip must be thick enough to afford sacrificial protection, and for this purpose the thickness must be at least $15 \times 10^{-6}$ inches. The maximum thickness of the strip is unimportant from a corrosion protecting standpoint; however, practical production considerations dictate that it is preferable that the strip not be any thicker than about $3 \times 10^{-3}$ inches. Since the coatings thicker than $3 \times 10^{-3}$ inches do not significantly increase the degree of protection afforded and merely add to the expense and production problems, they should be avoided.

The term "stainless steel" as applied in the present specification, is intended to include all the steels classified by the American Iron and Steel Institute as being standard grades of stainless steel. These include the type 400 series stainless steels that contain chromium in amounts of from about 10%, by weight, to about 30%, by weight, and generally less than 1% carbon, such as AISI types 410 and 430 and additionally the AISI type 300 series which contain, in addition to Cr and C, a nickel content of from 6 to 30% which renders the steel structure "austenitic," such as AISI type 301, 302 and 304, and the 200 series steels which contain not only nickel in amounts of 1 to 10%, but also up to about 30% Mn and .60% $N_2$ as additional austenitizers. Such various stainless steel analyses may contain additionally, as impurties or alloying ingredients, small amounts of P, S, Cu, Mo, Se, B, Be, Co, W, Ti, Cb, Ta, V, Zn, Al, Si, rare earths, etc. All stainless steels, however, contain chromium within the range of from about 10% to 30% and carbon up to about 1%. The Cr content in every instance is the element that primarily effects the essential property of oxidation and corrosion resistance, and consequently the article of the present invention may be broadly said to be composed partly of a steel that consists essentially of carbon in an amount up to about 1%, chromium from 10 to 30% and the balance iron.

Although several embodiments of this invention have been shown and described, various adaptations and modifications may be made without departing from the scope of the appended claims.

I claim:

1. An assembly comprising a stainless steel trim member in combination with a first metal less noble in the electromotive series than stainless steel; said stainless steel trim member having a bright and lustrous exposed surface and a contact surface abutting said first metal, said exposed surface converging with said contact surface, said contact surface having an aluminum coating greater than $15 \times 10^{-6}$ inches to prevent galvanic action between said first metal and said stainless steel trim and said exposed surface being substantially completely devoid thereon of aluminum and of compounds containing aluminum.

2. An assembly according to claim 1 wherein said aluminum coating is of a thickness of from $15 \times 10^{-6}$ inches to $3 \times 10^{-3}$ inches.

3. An assembly comprising a stainless steel trim member in combination with a carbon steel body; said stainless steel trim member having a bright and lustrous exposed surface and a contact surface abutting said carbon steel body, said exposed surface converging with said contact surface, said contact surface having an aluminum coating greater than $15 \times 10^{-6}$ inches to prevent galvanic action between said carbon steel body and said stainless steel trim and said exposed surface being substantially completely devoid thereon of aluminum and of compounds containing aluminum.

4. An assembly according to claim 3 wherein said aluminum coating is of a thickness of from $15 \times 10^{-6}$ inches to $3 \times 10^{-3}$ inches.

5. An assembly comprising a stainless steel trim member in combination with a painted carbon steel motor vehicle body; said stainless steel trim member having a bright and lustrous exposed surface and a contact surface abutting said painted carbon steel body, said contact surface having an aluminum coating greater than $15 \times 10^{-6}$ inches to prevent galvanic action between said painted carbon steel body and said stainless steel trim, said aluminum being in direct contact with said carbon steel body and said exposed surface being substantially completely devoid thereon of aluminum and of compounds containing aluminum.

References Cited

UNITED STATES PATENTS

| 2,490,978 | 12/1949 | Osterheld | 29—196.2 X |
| 2,762,771 | 9/1956 | Preiser | 29—196.2 X |
| 3,201,210 | 8/1965 | Harkins et al. | 29—183.5 |
| 3,201,211 | 8/1965 | Renshaw et al. | 29—183.5 |
| 3,201,212 | 8/1965 | Zaremski | 29—183.5 |
| 3,352,005 | 11/1967 | Avellone | 29—196.2 X |

L. DEWAYNE RUTLEDGE, Primary Examiner

ERNEST L. WEISE, Assistant Examiner

U.S. Cl. X.R.

29—191.6, 196.2, 196.5